United States Patent
Albert

(10) Patent No.: US 9,573,269 B2
(45) Date of Patent: Feb. 21, 2017

(54) TOOL-HOLDER FIXED TO A WORKPIECE

(71) Applicant: Airbus Operations SAS, Toulouse (FR)

(72) Inventor: Fabien Albert, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 15/058,603

(22) Filed: Mar. 2, 2016

(65) Prior Publication Data

US 2016/0256995 A1 Sep. 8, 2016

(30) Foreign Application Priority Data

Mar. 2, 2015 (FR) ...................................... 15 51721

(51) Int. Cl.
*F16M 13/00* (2006.01)
*B25H 1/00* (2006.01)
(Continued)

(52) U.S. Cl.
CPC .......... *B25H 1/0057* (2013.01); *B23Q 1/012* (2013.01); *B23Q 9/0042* (2013.01); *B25H 5/00* (2013.01);
(Continued)

(58) Field of Classification Search
USPC ........................................................ 248/550
See application file for complete search history.

(56) References Cited

U.S. PATENT DOCUMENTS 5,379,510 A * 1/1995 Berge .................... B23B 39/003
29/564
5,588,418 A 12/1996 Holmes et al.
(Continued)

FOREIGN PATENT DOCUMENTS

EP 2 258 515 12/2010
EP 2 674 244 12/2013

OTHER PUBLICATIONS

French Search Report cited in FR 1551721 completed Jan. 21, 2016, two pages.

*Primary Examiner* — Monica Millner
(74) *Attorney, Agent, or Firm* — Nixon & Vanderhye P.C.

(57) ABSTRACT

A tool-holder including: a first rail and a second rail that are parallel and each of which includes first fixing elements configured for fixing said rail to the surface, a driving slide including first guiding elements configured to slide over the first rail, a drive system configured to move the driving slide along the first rail and a first fixing system, a driven slide including second guiding elements configured to provide a sliding connection with the second rail and a second fixing system, an assembly bar carrying a first complementary fixing system cooperating with the first fixing system to form a removable fixing between them, a second complementary fixing system intended to cooperate with the second fixing system to form a removable fixing between them, and a carriage having a first assembly system, and a movement system on which the carriage is fixed and that is configured to move said carriage along the assembly bar, and a support module including second fixing elements for fixing the tool and a second assembly system intended to cooperate with the first assembly system to form a removable fixing between them.

10 Claims, 8 Drawing Sheets

(51) Int. Cl.
  *B23Q 1/01*    (2006.01)
  *B23Q 9/00*    (2006.01)
  *B25H 5/00*    (2006.01)
  *B64F 5/00*    (2006.01)

(52) U.S. Cl.
  CPC ...... *B23Q 2210/008* (2013.01); *B64F 5/0009* (2013.01)

(56) References Cited

U.S. PATENT DOCUMENTS

| | | | | |
|---|---|---|---|---|
| 6,172,374 | B1* | 1/2001 | Banks | B21J 15/10 227/69 |
| 2002/0057952 | A1* | 5/2002 | Haferkorn | B23Q 1/012 409/201 |
| 2002/0131836 | A1* | 9/2002 | Ferrari | B23Q 1/012 409/212 |
| 2003/0116331 | A1 | 6/2003 | Boyl-Davis et al. | |
| 2005/0265798 | A1 | 12/2005 | Boyl-Davis et al. | |
| 2008/0083128 | A1 | 4/2008 | O'Connor | |
| 2008/0087128 | A1* | 4/2008 | Garner | B23Q 1/012 74/490.09 |
| 2008/0244888 | A1* | 10/2008 | Sarh | B21J 15/14 29/402.01 |
| 2010/0031487 | A1* | 2/2010 | Messina | B23K 26/38 29/26 A |
| 2014/0305217 | A1* | 10/2014 | Tapia | B64F 5/0045 73/618 |
| 2016/0176003 | A1* | 6/2016 | Reckev Cius | B23Q 3/1546 269/8 |

* cited by examiner

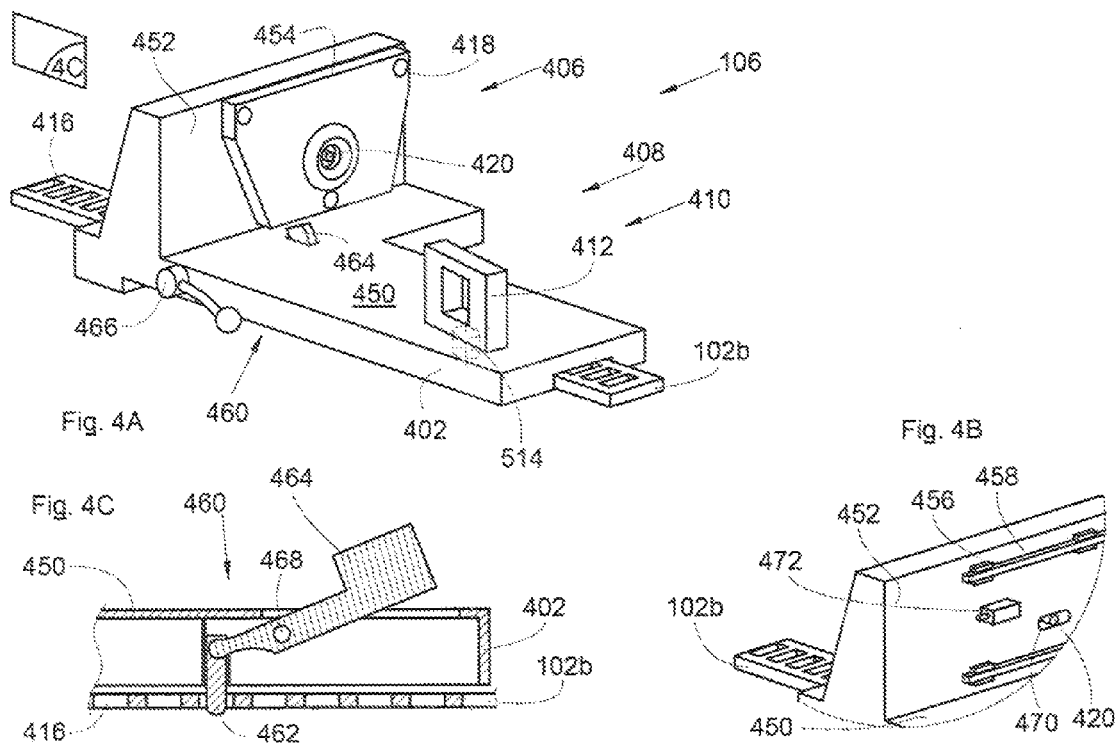

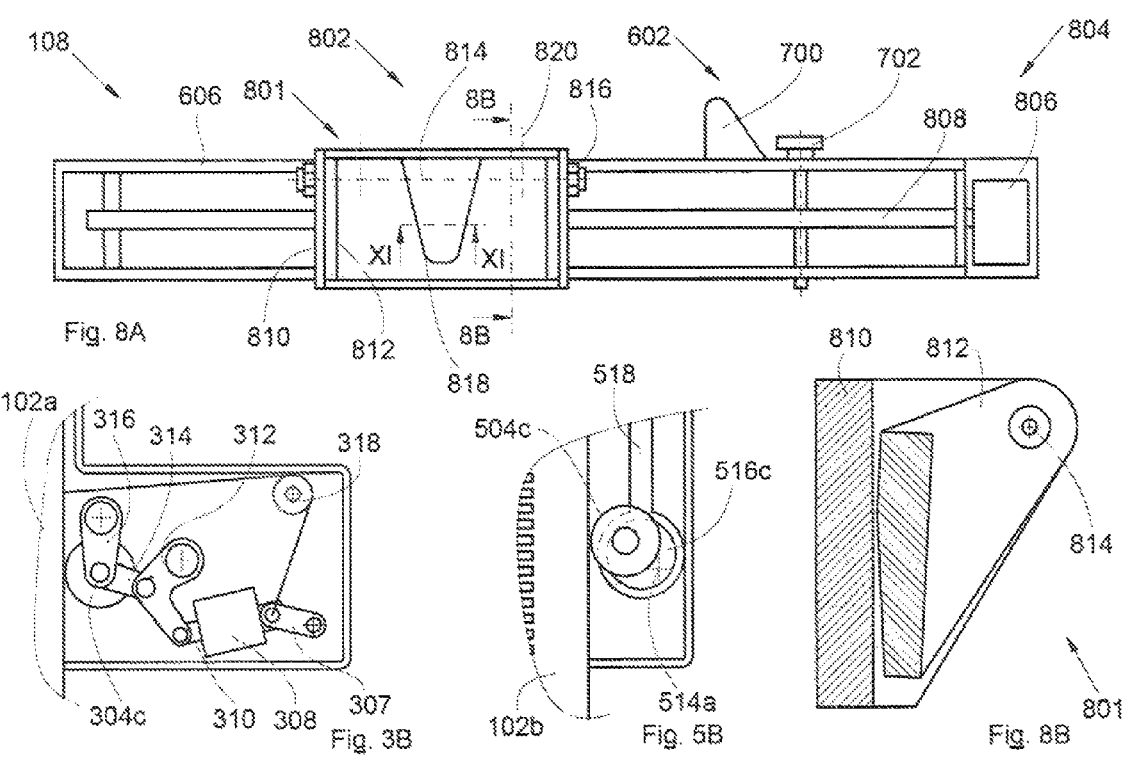

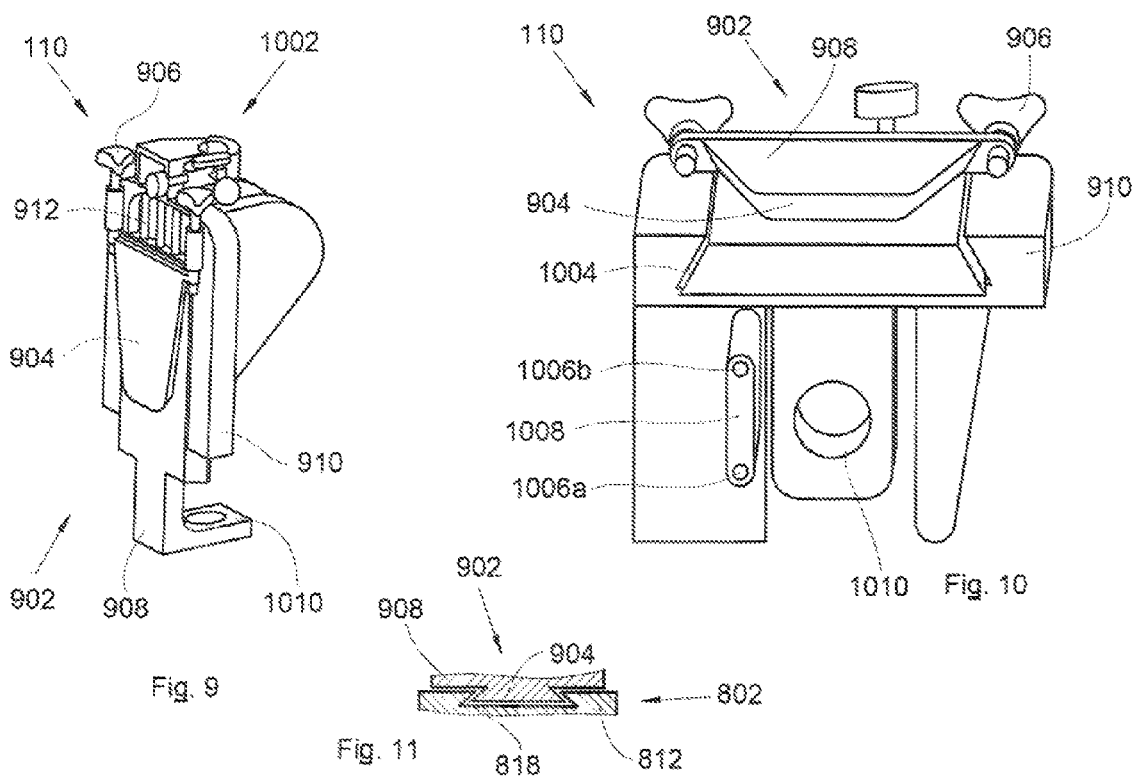

TOOL-HOLDER FIXED TO A WORKPIECE

RELATED APPLICATION

This application claims priority to French Patent Application No. 1551721 filed Mar. 2, 2015, the entirety of which is incorporated by reference.

TECHNICAL FIELD

The present invention concerns a tool-holder that enables a tool that it carries to move in translation on a workpiece. The tool-holder may be used in particular in the context of building an aircraft.

BACKGROUND OF INVENTION

An aircraft fuselage is constructed by assembling panels that are riveted together. Such assembly necessitates at least three successive operations, namely drilling, inserting a rivet and inspecting the rivet inserted in this way.

These various operations are carried out using different tools that are often bulky and are adaptable to only a relatively limited extent, which in particular makes their use and maintenance fairly complex.

SUMMARY OF THE INVENTION

A tool-holder has been conceived and is disclosed herein to be fixed to a surface of a workpiece and carry a tool, said tool-holder including:

(i) a first rail and a second rail that are parallel and each of which includes first fixing elements configured for fixing said rail to the surface, (ii) a driving slide including first guiding elements that have a guiding position in which said first guiding elements are configured to provide a sliding connection between the driving slide and the first rail, a drive system configured to move the driving slide along the first rail, and a first fixing system, (iii) a driven slide including second guiding elements that have a guiding position in which said second guiding elements are configured to provide a sliding connection between the driven slide and the second rail and a second fixing system, (iv) an assembly bar a first end of which carries a first complementary fixing system intended to cooperate with the first fixing system to form a removable fixing between them, a second end of which carries a second complementary fixing system intended to cooperate with the second fixing system to form a removable fixing between them, and a carriage having a first assembly system, and a movement system on which the carriage is fixed and that is configured to move said carriage along the assembly bar, and (v) a support module including second fixing elements for fixing the tool and a second assembly system intended to cooperate with the first assembly system to form a removable fixing between them, wherein each of the first and second guiding elements includes at least three grooved wheels, at least two of which are disposed along a first longitudinal edge of the first rail, respectively second rail, and at least one of which is disposed along a second longitudinal edge of the first rail, respectively second rail, wherein for each of the first or second guiding elements, at least one group from said at least two grooved wheels or said at least one grooved wheel is movable from the guiding position to a releasing position in which said at least one group is at a distance from the rail, and wherein the corresponding slide advantageously includes an actuating system configured to move said at least one group from the guiding position to the releasing position and vice versa, wherein for each of the first and second guiding elements, the actuating system includes a handle that can be moved from a locking position to an unlocking position and, for the movable grooved wheels, an offsetting system mobile between a guiding position in which said grooved wheels are in the guiding position and a releasing position in which said grooved wheels are in the releasing position, and a transmission system configured to drive the movement of the offsetting system from the guiding position to the releasing position when the handle is manoeuvred from the locking position to the unlocking position and vice versa, and wherein for one of the first and second guiding elements, the handle takes the form of a trigger, wherein the transmission system takes the form of a cable connecting the trigger to the offsetting system, and wherein the offsetting system includes:

(i) an actuator with a rod, (ii) an offsetting arm having a first end connected to the cable and on which the actuator is rotatably mounted and a second end rotatably mounted on the chassis, (iii) a first arm rotatably mounted on the chassis and articulated to the rod, (iv) a second arm one end of which is mounted on and articulated to the first arm, and (v) a third arm rotatably mounted on the chassis and carrying the grooved wheel, and the other end of the second arm is mounted on and articulated to the third arm.

A modular tool-holder of this kind is therefore easily assembled, which facilitates its use and maintenance operations.

At least one group from said at least two grooved wheels or said at least one grooved wheel is advantageously movable from the guiding position to a releasing position in which said at least one group is at a distance from the rail, and the slide advantageously includes an actuating system configured to move said at least one group from the guiding position to the releasing position and vice versa.

The actuating system advantageously includes a handle that can be moved from a locking position to an unlocking position and, for the movable grooved wheels, an offsetting system mobile between a guiding position in which said grooved wheels are in the guiding position and a releasing position in which said grooved wheels are in the releasing position, and a transmission system configured to drive the movement of the offsetting system from the guiding position to the releasing position when the handle is manoeuvred from the locking position to the unlocking position and vice versa.

In one particular embodiment the handle takes the form of a trigger, the transmission system takes the form of a cable connecting the trigger to the offsetting system, and the offsetting system includes:

(i) an actuator with a rod, (ii) an offsetting arm having a first end connected to the cable and on which the actuator is rotatably mounted and a second end rotatably mounted on the chassis, (iii) a first arm rotatably mounted on the chassis and articulated to the rod, (iv) a second arm one end of which is mounted on and articulated to the first arm, and (v) a third arm rotatably mounted on the chassis and carrying the grooved wheel, and the other end of the second arm is mounted on and articulated to the third arm.

Advantageously, for the other of the first and second guiding elements, the handle is a rotary knob, the transmission system is a shaft rotatable about its axis, referred to as the transmission axis, fastened to the rotary knob and the second offsetting system, and the offsetting system includes:

(i) a first hub rotatable on the chassis and fixed to the shaft and the rotation axis of which is offset relative to its centre and coincides with the transmission axis, the grooved wheel being rotatably mounted on the first hub, (ii) a second hub rotatable on the chassis and the rotation axis of which is offset relative to its centre, the grooved wheel being rotatably mounted on the second hub, (iii) a fixed shaft around which the second hub is rotatably mounted, and (iv) a link the first end of which is rotatably mounted on the first hub to rotate about an axis parallel to the transmission axis and the second end of which is mounted on the second hub to rotate about an axis parallel to the transmission axis.

The second rail advantageously has slots, the driven slide advantageously includes a tooth and a security system that is configured to insert the tooth in a slot when the assembly bar is released from said driven slide and to extract the tooth from the slot when the assembly bar is fixed to said driven slide or if a technician intentionally activates it.

The security system advantageously includes:

(i) a security shaft mounted on the driven slide to rotate about an axis parallel to the plane of the second rail, (ii) a lever fixed to the security shaft a first end of which projects relative to the driven slide and a second end to which the tooth is articulated, (iii) return means that urge the lever into the position in which the first end projects relative to the driven slide, and (iv) a security handle fixed to the security shaft.

The first fixing system and/or the second fixing system advantageously include(s) a stud with a head the axis of which is perpendicular to the plane of the rail and the first complementary fixing system, respectively the second complementary fixing system, advantageously includes an attachment system which includes:

(i) two jaws, each being mounted on the chassis to rotate about a clamping axis parallel to the plane of the rail between a clamping position in which the jaws grip the head and a free position in which the jaws release the head, (ii) for each jaw, return means that urge said jaw into the clamping position, and (iii) a release system configured to move the two jaws from the clamping position to the free position.

The first fixing system and/or the second fixing system advantageously include(s) a plurality of orifices and a threaded rod the axes of which are parallel to the direction of the rail and the first complementary fixing system, respectively the second complementary fixing system, include(s):

(i) for each orifice, a protuberance adapted to be inserted in the orifice, and (ii) a threaded hole adapted to receive the threaded rod.

The plurality of orifices and the threaded rod are advantageously disposed on a plate that is mounted on the slide and mobile in translation in a direction perpendicular to the longitudinal direction of the rail and parallel to the plane of the rail.

The carriage advantageously includes a base fixed to the movement system, a mobile support mounted on the base to rotate about a tool axis parallel to the longitudinal direction of the assembly bar, stop means for stopping the rotation of the mobile support, and the first assembly system arranged on the mobile support.

The support module advantageously includes a base carrying the second assembly system, a drawer mounted on the base to move in translation in a direction perpendicular to the plane of the rails, actuating means for moving the drawer on the base, and the second fixing elements are advantageously disposed on the drawer.

The support module advantageously includes a base, a drawer and actuating means for moving the drawer in translation on the base in a direction perpendicular to the plane of the rails.

The support module advantageously includes two pressure sensors aligned with each other in the longitudinal direction of the rails, the pressure sensors are mounted on a spring-mounted slide mobile in translation on the drawer in a direction perpendicular to the plane of the rails. Said pressure sensors make it possible to identify the angular offset between the tool and the surface of the workpiece. The tool-holder includes a control unit that controls the driving system and the actuating means and that receives information from the two pressure sensors.

BRIEF DESCRIPTION OF THE DRAWINGS

The above and other features of the invention will become more clearly apparent on reading the following description of one embodiment, said description being given with reference to the appended drawings, in which:

FIG. 3B shows a detail of the bottom view of the driving slide, FIG. 4A shows a perspective view of a driven slide of the tool-holder from FIG. 1, FIG. 4B shows a detail of the driven slide from FIG. 4A, FIG. 4C shows a section of the driven slide from FIG. 4A in the plane 4C in FIG. 4A, FIG. 5B shows a detail of the bottom view of the driven slide, FIG. 8A shows the assembly bar seen in the direction of the arrow VIII in FIG. 1, FIG. 8B shows a section of the assembly bar taken along the line 8B-8B in FIG. 8A, FIG. 9 shows a perspective view of a support module of the tool-holder from FIG. 1, FIG. 10 shows a bottom view of the support module, and FIG. 11 shows a section taken along the line XI-XI in FIG. 8A.

DETAILED DESCRIPTION OF EMBODIMENTS

Figure 1:
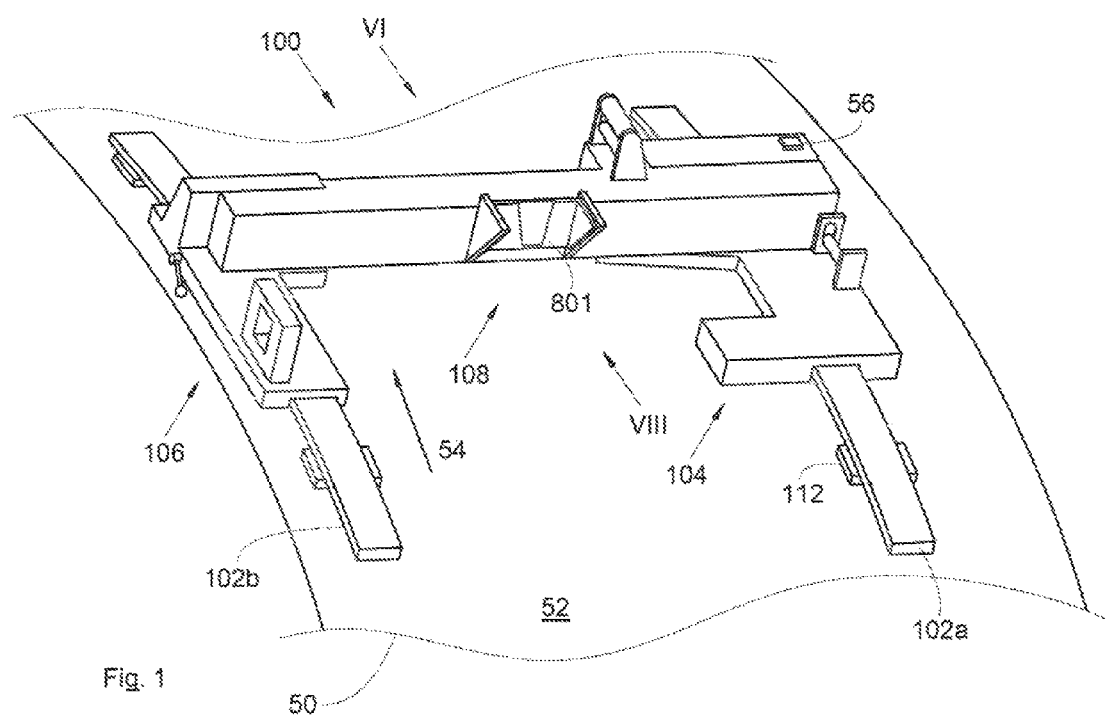
FIG. 1 shows a perspective view of a tool-holder in accordance with the invention.

In the following description, terms that relate to a position refer to a tool-holder when it is disposed on a surface of a workpiece as shown in FIG. 1.

FIG. 1 shows a tool-holder 100 that is positioned on and fixed to a surface 52 of a workpiece 50 that has to undergo particular processing by a tool carried by said tool-holder 100. For example, the processing may involve drilling the workpiece 50, fitting an insert, etc. The tool fitted is then appropriate for that processing.

The tool-holder 100 includes:

(i) a first rail 102a and a second rail 102b that are parallel and each of which includes first fixing elements 112 configured to fix the rails 102a, b to the surface 52, (ii) a driving slide 104, (iii) a driven slide 106, (iv) an assembly bar 108, and (v) a support module 110 (not shown in FIG. 1, see FIGS. 9 and 10).

In that the tool-holder 100 is more particularly intended to be used on an exterior surface of an aircraft fuselage, the rails 102a-b each have an appropriate flexibility and an appropriate curvature so that they can be applied to a curved exterior surface of the fuselage. In the remainder of the description, the surface that is parallel to the surface 52 of the workpiece 50 is referred to as the 'plane of the rails'. The plane of the rails may be flat in the case of a flat surface 52 or curved in the case of a curved surface 52.

The longitudinal direction of the rails 102a, b is represented by the arrow 54. If the surface 52 is flat, the longitudinal direction of the rails 102a, b takes the form of a straight line segment parallel to said surface 52. If the surface 52 is curved, the longitudinal direction of the rails 102a, b takes the form of a curve parallel to said surface 52.

Figure 2:
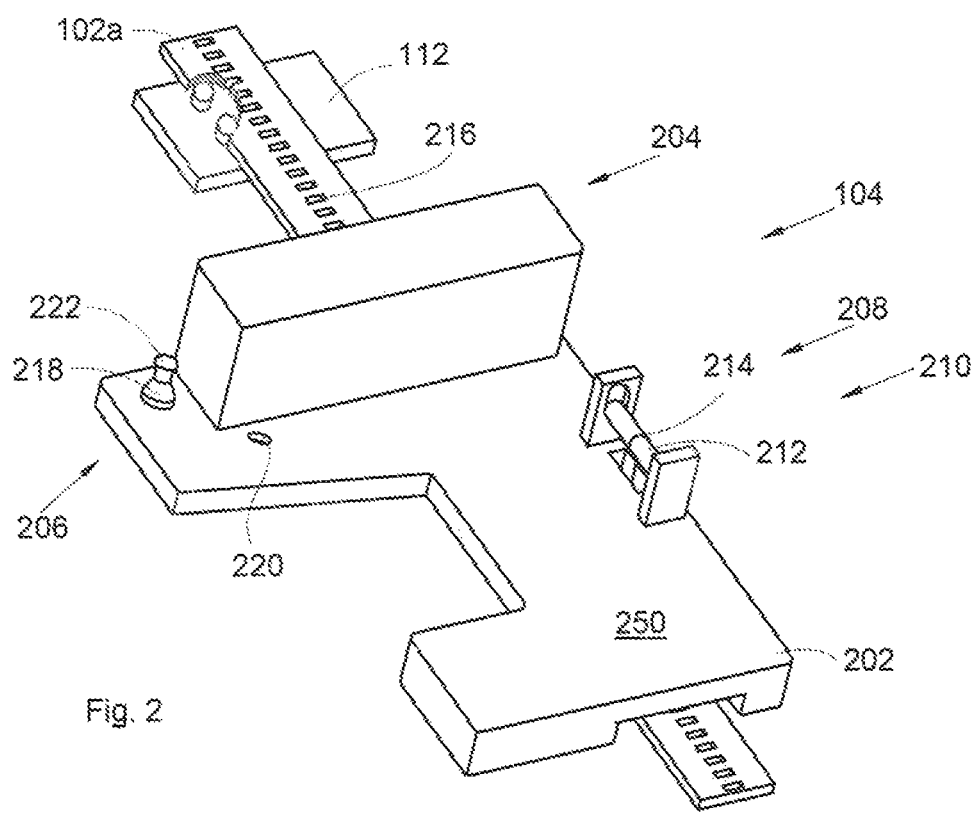
FIG. 2 shows a perspective view of a driving slide of the tool-holder form FIG. 1.
Figure 3A:
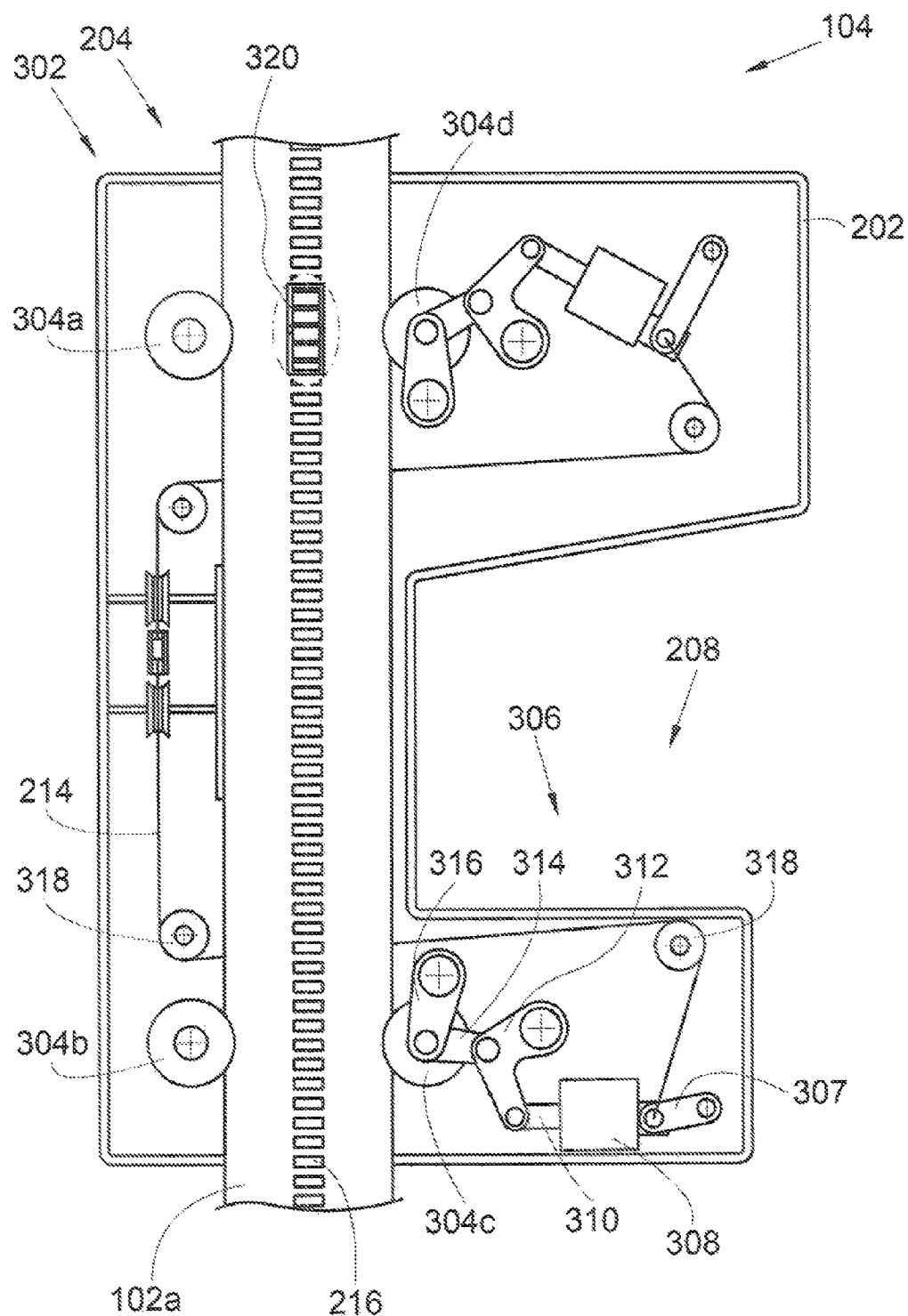
FIG. 3A shows a bottom view of the driving slide from FIG. 2.

FIG. 2 and FIGS. 3A and 3B show the driving slide 104 mounted on the first rail 102a and which includes:

(i) a chassis 202 carrying first guiding elements 302 having a guiding position in which the first guiding elements 302 are configured to provide a sliding connection between the driving slide 104 and the first rail 102a, (ii) a driving system 204 configured to move the driving slide 104 along the first rail 102a, and (iii) a first fixing system 206 the operation of which is described hereinafter.

FIGS. 4A-C and FIGS. 5A-B show the driven slide 106 mounted on the second rail 102b and which includes:

(i) a chassis 402 carrying second guiding elements 502 having a guiding position in which the second guiding elements 502 are configured to provide a sliding connection between the driven slide 106 and the second rail 102b, and (ii) a second fixing system 406 the operation of which is described hereinafter with the assembly bar 108.

FIGS. 6, 7 and 8A-B show the assembly bar 108 which includes a chassis 606 of elongate shape a first end of which carries a first complementary fixing system 602 intended to cooperate with the first fixing system 206 so as to form a removable fixing between them, a second end of which carries a second complementary fixing system 604 intended to cooperate with the second fixing system 406 so as to form a removable fixing between them, and a carriage 801 mounted to be mobile in translation along the chassis 606 of the assembly bar 108 and having a first assembly system 802.

FIGS. 9 and 10 show the support module 110 including second fixing elements 1002 for fixing the tool to the support module 110 and a second assembly system 902 intended to cooperate with the first assembly system 802 so as to form a removable fixing between them.

A first part is said to be removably mounted on a second part if the first part can be detached from the second part without damaging either part.

The modular design of the tool-holder 100 facilitates mounting and demounting it, as well as verifying each component of the tool-holder 100 independently of the others and where appropriate its refurbishment or replacement.

The first fixing elements 112 are suckers distributed along each rail 102a-b that are applied to the surface 52, for example. The first fixing elements 112 may also be a series of magnets fastened to each rail 102a-b when the workpiece 50 is made of metal.

The driving system 204 includes an electric motor and a toothed wheel 320 (seen in the FIG. 3A partial section) that is driven in rotation about a rotation axis by the motor and meshes with slots 216 of the first rail 102a. The rotation axis is parallel to the plane of the first rail 102a and perpendicular to the longitudinal direction of the first rail 102a. When the motor is activated, the toothed wheel 320 therefore turns and its teeth mesh with the slots 216 to move the driving slide 104 one way or the other according to the direction of rotation of the motor.

Here the first guiding elements 302 and the second guiding elements 502 consist of four grooved wheels 304a-d, respectively 504a-d, two of which are disposed along a first longitudinal edge of the first rail 102a, respectively second rail 102b, and two of which are disposed along a second longitudinal edge of the first rail 102a, respectively second rail 102b. Each longitudinal edge of the rail 102a, b is positioned in the bottom of the grooves of the corresponding grooved wheels 304a-d, 504a-d, which therefore grip the rail 102a, b, thereby ensuring the creation of a sliding connection and preventing the slide 104, 106 separating from the rail 102a-b. Each grooved wheel 304a-d, 504a-d is rotatable about its axis.

In that the rails 102a-b can be curved, the rotation axis of each grooved wheel 304a-d, 504a-d is oriented so that said grooved wheels 304a-d, 504a-d rotate and said grooved wheels 304a-d, 504a-d follow the rails 102a-b when the driving slide 104 and the driven slide 106 move along the curved rails 102a-b.

More generally, the first guiding elements 302 and the second guiding elements 502 include at least three grooved wheels 304a-d, 504a-d, at least two of which are disposed along a first longitudinal edge of the first rail 102a, respectively second rail 102b, and at least one of which is disposed along a second longitudinal edge of the first rail 102a, respectively second rail 102b.

In another embodiment it is not shown, the first and second guiding elements include a groove parallel to the rail 102a-b in which the edge of said rail 102a-b is inserted and, in the bottom of the groove, a succession of rollers with axes perpendicular to said rail 102a-b and against which said edge rolls.

Here the first guiding elements 302 are disposed below a bottom 250 of the driving slide 104 that lies in a plane locally parallel to the plane of the first rail 102a. Here the second guiding elements 502 are disposed below a bottom 450 of the driven slide 106 that lies in a plane locally parallel to the plane of the second rail 102b.

The driving slide 104 and the driven slide 106 may be installed at the level of the ends of the first rail 102a and the second rail 102b and each slide 104, 106 slid into the required position.

To facilitate this installation, the first guiding elements 302 can be moved from the guiding position to a releasing position in which they do not provide the sliding connection and enable separation of the driving slide 104 from the first rail 102a. In the releasing position, the first guiding elements 302 are at a distance from the edge of the first rail 102a. To this end, the driving slide 104 includes a first actuating system 208 configured to move the first guiding elements 302 from the guiding position to the releasing position and vice versa. FIG. 3B shows the grooved wheel 304c in the releasing position in which it is disengaged from the longitudinal edge of the first rail 102a.

In the same manner, the second guiding elements 502 can be moved from the guiding position to a releasing position in which they do not provide the sliding connection and enable separation of the driven slide 106 from the second rail 102b. In the releasing position, the second guiding elements 502 are at a distance from the edge of the second rail 102b. To this end, the driven slide 106 includes a second actuating system 408 configured to move the second guiding elements 502 from the guiding position to the releasing position and vice versa. FIG. 5B shows the grooved wheel 504c in the releasing position in which it is disengaged from the longitudinal edge of the second rail 102b.

As shown in FIGS. 3A-B and FIGS. 5A-B, to release the rail 102a-b from the grip of the grooved wheels 304a-d, 504a-d the grooved wheels 304c-d, 504c-d, which are along the same longitudinal edge of the rail 102a-b, are moved away from said rail 102a-b in order to release said longitudinal edge. Of course, it is possible for all the grooved wheels 304a-d, 504a-d to be moved away from each of the longitudinal edges.

Generally speaking, to effect the movement from the guiding position to the releasing position, at least one group from said at least two grooved wheels or said at least one grooved wheel can be moved from the guiding position to the releasing position in which said at least one group is at a distance from the rail and therefore does not provide the sliding connection and enables separation of the driving slide 104, respectively driven slide 106, from the first rail 102a, respectively second rail 102b, by disengaging the rail 102a-b from the groove. The first actuating system 208 is therefore configured to move said at least one group from the guiding position to the releasing position and vice versa and the second actuating system 408 is therefore configured to move said at least one group from the guiding position to the releasing position and vice versa.

The first actuating system 208 and the second actuating system 408 include a first handle 210, respectively second handle 410, that can be moved by a user from a locking position to an unlocking position and, for the movable grooved wheels 304c-d, 504c-d, a first offsetting system 306, respectively second offsetting system 506, mobile between a guiding position in which said grooved wheels 304c-d, 504c-d are in a guiding position and a releasing position in which said grooved wheels 304c-d, 504c-d are in a releasing position, and a first transmission system 214, respectively second transmission system 514, configured to drive the movement of the first offsetting system 306, respectively second offsetting system 506, from the guiding position to the releasing position when the first handle 210, respectively second handle 410, is manoeuvred from the locking position to the unlocking position and vice versa.

Here the first handle 210 takes the form of a trigger 212 mobile in translation in a plane perpendicular to the plane of the first rail 102a and guided by slides provided for this purpose in the chassis 202.

The second handle 410 takes the form of a rotary knob 412 rotatable about an axis perpendicular to the plane of the second rail 102b.

The first transmission system 214 takes the form of a cable connecting the trigger 212 to said first offsetting system 306.

The second transmission system 514 takes the form of a shaft (shown in dashed outline in FIG. 4A) fastened on the one hand to the rotary knob 412 and on the other hand to the second offsetting system 506. The shaft 514 is rotatable about its axis shown in FIGS. 5A-B, and referred to as the transmission axis 514a, which is perpendicular to the plane of the second rail 102b.

In the embodiment of the invention as shown in FIGS. 3A-B, the first offsetting system 306 consists of two similar assemblies each of which here includes:

(i) an actuator 308 with a rod 310, for example a pneumatic cylinder, (ii) an offsetting arm 307 having a first end connected to the cable 214 on which the actuator 308 is rotatably mounted, and a second end rotatably mounted on the chassis 202, (iii) a first arm 312 rotatably mounted on the chassis 202 and articulated to the rod 310, (iv) a second arm 314 one end of which is mounted on and articulated to the first arm 312, and (v) a third arm 316 rotatably mounted on the chassis 202 and carrying the grooved wheel 304c, and the other end of the second arm 314 is mounted on and articulated to the third arm 316.

When the actuator 308 is activated, for example by compressed air in the case of a pneumatic cylinder, the rod 310 is locked in position, which urges the grooved wheel 304c into the guiding position against the rail 102a.

When the actuator 308 is not activated, the rod 310 is position not locked in position and actuation of the trigger 212 pulls on the cable 214 that rotates the offsetting arm 307 and therefore the actuator 308 and its rod 310 and the arms 312, 314 and 316 so as to place the grooved wheel 304c in the releasing position as shown in FIG. 3B. Conversely, when the trigger 212 is released, return means of the torsion spring type return said trigger 212 into its initial position. The return of the trigger 212 into its initial position leads to the offsetting arm 307 returning into its initial position (FIG. 3A) where activation of the actuator 308 again locks the grooved wheel 304c in the guiding position.

The cable 214 is routed from the trigger 212 to the actuator 308 with the aid of a series of pulleys 318.

Figure 5A:
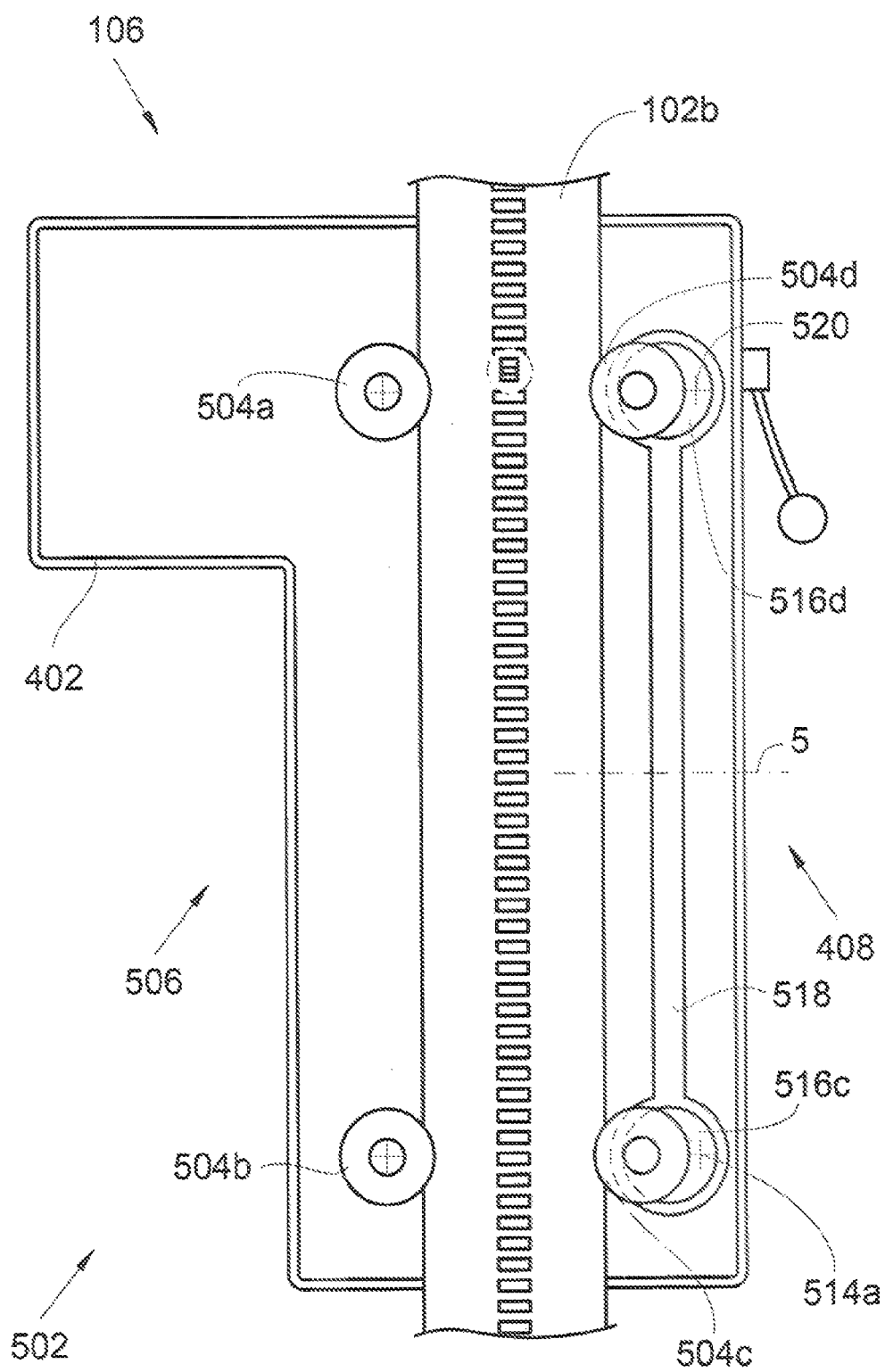
FIG. 5A shows a bottom view of the driven slide from FIG. 4A.
Figure 6:
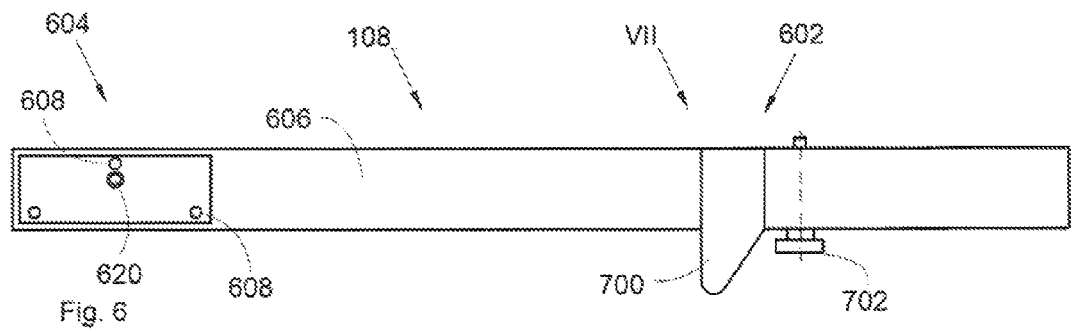
FIG. 6 shows an assembly bar seen in the direction of the VI in FIG. 1.

In the embodiment of the invention as represented in FIGS. 5A-B there are two mobile grooved wheels 504c-d and the second offsetting system 506 has a plane of symmetry (represented by the line 5 in FIG. 5A) that is the median plane between the two grooved wheels 504c-d that is perpendicular to the longitudinal direction of the second rail 102b.

The second offsetting system 506 includes:

(i) a first hub 516c rotatable on the chassis 402, the first hub 516c is fixed to the shaft 514 constituting the second transmission system 514 and the rotation axis is offset relative to its centre and coincides with the transmission axis 514a, the grooved wheel 504c being rotatably mounted on the first hub 516c, (ii) a second hub 516d that is symmetrical to the first hub 516c with respect to the plane of symmetry 5, the second hub 516d is rotatable on the chassis 402 and the rotation axis is offset relative to its centre, the grooved wheel 504d being rotatably mounted on the second hub 516d, (iii) a fixed shaft 520 the axis of which is symmetrical to the transmission axis 514a with respect to the plane of symmetry 5 and on which the second hub 516d is rotatably mounted, and (iv) a link 518 the first end of which is mounted on the first hub 516c to rotate about an axis parallel to the transmission axis 514a and the second end of which is mounted on the second hub 516d to rotate about an axis parallel to the transmission axis 514a.

Rotating the rotary knob 412 drives the rotation of the shaft 514 about its transmission axis 514a and the rotation of the first hub 516c and the retraction of the grooved wheel 504c and at the same time the movement of the link 518 will drive the rotation of the second hub 516d around the fixed shaft 520 and the retraction of the grooved wheel 504d. Rotating the rotary knob 412 in the opposite direction will return the grooved wheels 504c-d into their original positions.

If the motor of the drive system 204 does not receive any activation instruction or is not supplied with electrical power it does not rotate and therefore immobilizes the driving slide 104 against movement in translation by virtue of the fact that a tooth of the toothed wheel 320 is inserted in a slot 216.

The handle, the offsetting system and the transmission system can be inverted between the first and second guiding elements.

To immobilize the driven slide 106 when the assembly bar 108 is not in place the second rail 102b features slots 416 and the driven slide 106 includes a tooth 462 and a security system 460 that is configured to insert the tooth 462 into a slot 416 when the assembly bar 108 is released from said driven slide 106 and therefore to immobilize the driven slide 106 against movement in translation and extracts the tooth 462 from the slot 416 and therefore restores to the driven slide 106 the freedom to move in translation if the assembly bar 108 is fixed to said driven slide 106 or if a technician activates it intentionally.

One particular embodiment of the security system 460 will be explained with reference to FIGS. 4A and 4C. The tooth 462 is mounted on the chassis 402 so as to be mobile in translation and to be more specific below the bottom 450 in a direction perpendicular to the plane of the second rail 102b.

The security system 460 includes a security shaft 468 mounted on the chassis 402 of the driven slide 106 to rotate around an axis locally parallel to the plane of the second rail 102b and a lever 464 fixed to the security shaft 468. The lever 464 has a first end projecting relative to the bottom 450 of the driven slide 106 and a second end to which the tooth 462 is articulated; when the assembly bar 108 is fitted, it therefore bears on the first end, driving tilting of the lever 464 and raising of the second end and of the tooth 464, which leaves the slot 416.

To ensure automatic return of the tooth 464 into a slot 416 on removal of the assembly bar 108, the security system 460 includes return means, such as a spring, for example, that urge the levers 464 into the position in which the first end projects relative to the bottom 450 of the driven slide 106.

To enable a technician to move the driven slide 106 even if the assembly bar 108 is absent the security system 460 includes a security handle 466 that is fixed to the security shaft 468. Rotating the security handle 466 therefore drives rotation of the security shaft 468 and therefore tilting of the lever 464 and raising of the teeth 462.

On each slide 104, 106 the assembly bar 108 is brought to bear on the one hand against a face of the chassis 202, 402 of said slide 104, 106 that is parallel to the plane of the rail 102a-b corresponding to said slide 104, 106 and on the other hand against a face of the chassis 202, 402 of said slide 104, 106 that is perpendicular to the longitudinal direction of the rail 102a-b corresponding to said slide 104, 106.

For the driving slide 104, the assembly bar 108 bears against the bottom 250 and against a wall of the chassis 202 that here encompasses the drive system 204 and that is perpendicular to the bottom 250 and locally to the longitudinal direction of the first rail 102a.

For the driven slide 106, the assembly bar 108 bears against the bottom 450 and against a wall 452 having a first face perpendicular to the bottom 450 and locally to the longitudinal direction of the second rail 102b.

Here the first fixing system 206 includes a screwthread 220 and a stud 218 with a head 222 that are installed in the bottom 250 and the axes of which are perpendicular to the plane of the first rail 102a.

The first complementary fixing system 602 includes an attachment system 700 that is configured to cooperate with the stud 218 and more specifically with the head 222 and a fixing screw 702 designed to cooperate with the screw thread 220 on fitting the assembly bar 108.

Figure 7:
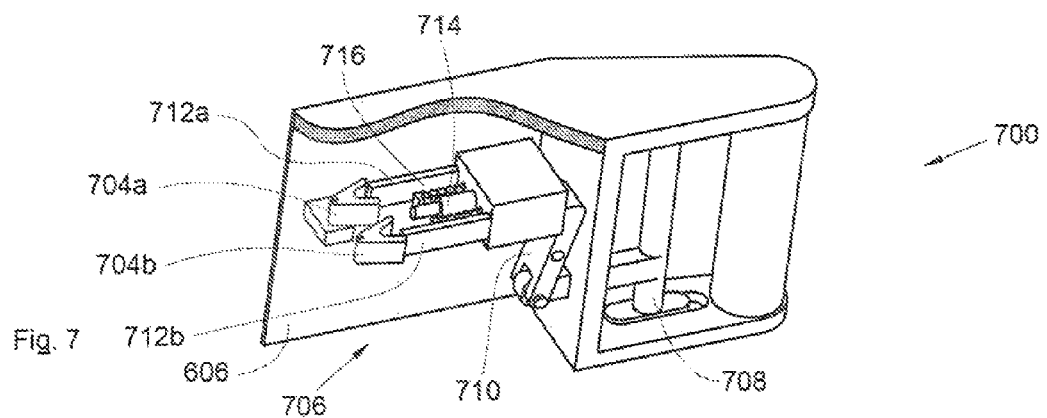
FIG. 7 shows a detail of the assembly bar from FIG. 6 seen in the direction of the arrow VII in FIG. 1.

The attachment system 700 will be described with reference to FIG. 7, which is a partially exploded view. The attachment system 700 includes:

(i) two drawers 704a-b, each being mounted on the chassis 606 to rotate about a clamping axis parallel to the plane of the first rail 102a between a clamping position in which the jaws 704a-b grip the head 222 and a released position in which the drawers 704a-b release the head 222, (ii) for each jaw 704a-b, return means, such as a torsion spring, for example, which urge said jaw 704a-b into the clamping position, and (iii) a releasing system 706 configured, when activated, to move the two drawers 704a-b from the clamping position to the released position.

The releasing system 706 includes:

(i) a handle 708, and (ii) a lever 710 mounted to rotate about an axis parallel to the plane of the first rail 102a, a first end of which is articulated to the handle 708 and a second end of which carries, for each jaw 704a-b, an arm 712a-b, and, for the head 222, a pusher rod 714.

When the handle 708 is actuated by a technician, the handle 708 pulls on the lever 710 to cause it to tilt and the arms 712a-b come to push on the jaws 704a-b to cause them to move into the released position, after which the pusher rod 714 bears on the head 222 to push it back and to extract it from the jaws 704a-b.

Here each jaw 704a-b has the shape of a V one of the branches of which grips the head 222 and the other of which is pushed by the arms 712a-b.

To enable the return to the initial position when the handle 708 is released, the return means, here two compression springs 716, are configured to push back the second end of the lever 710, bearing against the chassis 606.

Here the second fixing system 406 includes a plurality of (here three) orifices 418 and a threaded rod 420 that are disposed on the first face of the wall 452. The axes of the orifices 418 and of the threaded rod 420 are locally parallel to the direction of the second rail 102b. The head of the threaded rod 420 is accessible from the other side of the wall 452.

The second complementary fixing system 604 includes:

(i) for each orifice 418, a protuberance 608 designed to be inserted in the orifice 418 when fitting the assembly bar 108, and (ii) a screw threaded hole 620 designed to receive the threaded rod 420 on fitting the assembly bar 108.

In the embodiment of the invention shown in FIG. 4A, the first face of the wall 452 features a plate 454 that is mounted on the wall 452 of the driven slide 106 so as to be mobile in translation in a direction locally perpendicular to the longitudinal direction of the second rail 102b and locally parallel to the plane of the second rail 102b.

Such an arrangement enables adjustment of the position of the second fixing system 406 when fitting the assembly bar 108.

FIG. 4B shows an arrangement making it possible to use a sliding connection between the wall 452 and the plate 454. The wall 452 includes a set of grooves 456 and the plate 454 includes at least one beam 458 that is inserted in the grooves 456.

The wall 452 includes an oblong hole 470 to allow the threaded rod 420 to pass through the wall 452 and to move with the plate 454.

To allow the plate 454 to return automatically to its original position spring-mounted stud type return means 472 are provided.

Although the first fixing system 206, the first guiding elements 302 and the first actuating system 208 are described in relation to the driving slide 104 and the second fixing system 406, the second guiding elements 502 and the second actuating system 408 are described in relation to the driven slide 106, it is possible to interchange them or for both slides 104 and 106 to include identical elements.

To allow movement of the tool along the assembly bar 108 the latter is equipped with a movement system 804 to which the carriage 801 is fixed and that is configured to move said carriage 801 along the assembly bar 108, that is to say between the two rails 102a-b.

Here the movement system 804 includes a motor 806 and a threaded rod 808 driven in rotation by the motor 806.

FIG. 8B shows the carriage 801 in section. The carriage 801 includes a base 810 that is fixed to the movement system 804, and here more particularly to the threaded shaft 808, a mobile support 812 that is mounted on the base 810 to rotate about a tool axis 814 parallel to the longitudinal direction of the assembly bar 108, stopping means 816, here bolts, that make it possible to prevent rotation of the mobile support 812, and the first assembly system 802 that is arranged on the mobile support 812.

FIG. 11 shows in section the first assembly system 802 and the second assembly system 902.

The first assembly system 802 and the second assembly system 902 form a dovetail connection with complementary trapezium-shape profiles. The first assembly system 802 therefore includes a trapezium-shape and V-shape groove 818 in a direction locally perpendicular to the plane of the rails 102a-b and threaded holes 820 the axes of which are locally perpendicular to the planes of the rails 102a-b.

The support module 110 includes a base 908 and a drawer 910 mounted on the base 908 to move in translation in a direction perpendicular to the plane of the rails 102a-b.

The second assembly system 902 is disposed on the base 908 and here includes a trapezium-shape rib 904 that nests in the trapezium-shape groove 818 and a mounting screw 906 for each threaded hole 820.

The second fixing elements 1002 are disposed on the drawer 910. The second fixing elements 1002 comprise a hook and screw system.

The base 908 includes a bush 1010 in which the tip of the tool is positioned. The drawer 910 is guided on the base 908 by a dovetail connection 1004 forming a sliding connection in a direction perpendicular to the plane of the rails 102a-b. The drawer 910 is moved relative to the base 908 by actuating means 912, such as cylinders here, for example.

To ensure correct positioning of the tool relative to the surface 52, the support module 110 includes two pressure sensors 1006a-b aligned with each other in the longitudinal direction of the rails 102a-b. The pressure sensors 1006a-b are mounted on a spring-mounted slide 1008 mobile in translation on the drawer 910 in a direction perpendicular to the plane of the rails 102a-b. The pressure sensors 1006a-b make it possible to identify the angular offset between the tool and the surface of the workpiece.

The pressure sensors 1006a-b are for example of the contact movement sensor type or of the distance measuring type, for example using a laser.

The tool-holder 100 includes a control unit 56 that controls the driving system 204, the movement system 804 and the actuating means 912 and that receives information from the two pressure sensors 1006a-b.

After fitting the tool-holder 100, operation is as follows:
(i) the control unit 56 actuates the actuating means 912 to lower the drawer 910 until the tip of the tool placed in the bush 1010 is in contact with the surface 52,
(ii) the stopping means 816 are unlocked in order to free rotation of the mobile support 812,
(iii) as a function of the difference between the pressures measured by the pressure sensors 1006a-b, the control unit 56 commands activation of the driving system 204 in order to move the driving slide 104 and the driven slide 106,
(iv) during the movement of the driving slide 104 and the driven slide 106, the mobile support 812 pivots about the tool axis 814, bearing on the tip of the tool, which moves the pressure sensors 1006a-b,
(v) the movement of the driving slide 104 and the driven slide 106 continues in the appropriate direction to produce equal measured pressures,
(vi) the stopping means 816 are then locked in order to prevent rotation of the mobile support 812,
(vii) the tool is then positioned perpendicularly to the surface 52.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:
1. A tool-holder configured to be fixed to a surface of a workpiece and to carry a tool, said tool-holder comprising:
a first rail and a second rail that are parallel and each of which includes first fixing elements configured to fix one of the first and second rails to the surface;
a driving slide including first guiding elements that have a guiding position in which said first guiding elements are configured to provide a sliding connection between the driving slide and the first rail;

a drive system configured to move the driving slide along the first rail;

a first fixing system;

a driven slide including second guiding elements that have a guiding position in which said second guiding elements are configured to provide a sliding connection between the driven slide and the second rail and a second fixing system, an assembly bar a first end of which carries a first complementary fixing system intended to cooperate with the first fixing system to form a removable fixing between them, a second end of which carries a second complementary fixing system intended to cooperate with the second fixing system to form a removable fixing between them, a carriage having a first assembly system, and a movement system on which the carriage is fixed and that is configured to move said carriage along the assembly bar, and a support module including second fixing elements for fixing the tool and a second assembly system intended to cooperate with the first assembly system to form a removable fixing between them, wherein each of the first and second guiding elements includes at least three grooved wheels, at least two of which are disposed along a first longitudinal edge of the first rail, respectively second rail, and at least one of which is disposed along a second longitudinal edge of the first rail, respectively second rail, wherein for each of the first or second guiding elements, at least one group from said at least two grooved wheels or said at least one grooved wheel is movable from the guiding position to a releasing position in which said at least one group is at a distance from the rail, and wherein the corresponding slide includes an actuating system configured to move said at least one group from the guiding position to the releasing position and vice versa, wherein for each of the first and second guiding elements, the actuating system includes a handle that can be moved from a locking position to an unlocking position and, for the movable grooved wheels, an offsetting system mobile between a guiding position in which said grooved wheels are in the guiding position and a releasing position in which said grooved wheels are in the releasing position, and a transmission system configured to drive the movement of the offsetting system from the guiding position to the releasing position when the handle is manoeuvred from the locking position to the unlocking position and vice versa, and wherein for one of the first and second guiding elements, the handle takes the form of a trigger, wherein the transmission system includes a cable connecting the trigger to the offsetting system, and wherein the offsetting system includes:

an actuator with a rod, an offsetting arm having a first end connected to the cable and on which the actuator is rotatedly mounted and a second end rotatably mounted on the chassis, a first arm rotatably mounted on the chassis and articulated to the rod, a second arm one end of which is mounted on and articulated to the first arm, and a third arm rotatably mounted on the chassis and carrying the grooved wheel, and wherein the other end of the second arm is mounted on and articulated to the third arm.

2. The tool-holder according to claim 1, wherein for the other of the first and second guiding elements, the handle is a rotary knob, wherein the transmission system is a shaft rotatable about a transmission axis, fastened to the rotary knob and the second offsetting system, and wherein the offsetting system includes:

a first hub rotatable on the chassis and fixed to the shaft and the rotation axis of which is offset relative to its centre and coincides with the transmission axis, the grooved wheel being rotatably mounted on the first hub, a second hub rotatable on the chassis and the rotation axis of which is offset relative to its centre, the grooved wheel being rotatably mounted on the second hub, a fixed shaft around which the second hub is rotatably mounted, and a link the first end of which is rotatably mounted on the first hub to rotate about an axis parallel to the transmission axis and the second end of which is mounted on the second hub to rotate about an axis parallel to the transmission axis.

3. The tool-holder according to claim 1, wherein the second rail has slots, wherein the driven slide includes a tooth and a security system configured to insert the tooth in a slot when the assembly bar is released from said driven slide and to extract the tooth from the slot when the assembly bar is fixed to said driven slide or if intentionally activated.

4. The tool-holder according to claim 3, wherein the security system includes:

a security shaft rotatably on the driven slide to rotate about an axis parallel to the plane of the second rail;

a lever fixed to the security shaft a first end of which projects relative to the driven slide and a second end to which the tooth is articulated, a return mechanism configured to urge the lever into the position in which the first end projects relative to the driven slide, and a security handle fixed to the security shaft.

5. The tool-holder according to claim 1, wherein the first fixing system or the second fixing system includes a stud with a head, the axis of which is perpendicular to the plane of the rail and wherein the first complementary fixing system or the second complementary fixing system includes an attachment system comprising:

two jaws, each mounted on the chassis to rotate about a clamping axis parallel to the plane of the rail between a clamping position in which the jaws grip the head and a free position in which the jaws release the head for each jaw, a return device configured to urge said jaw into the clamping position, and a release system configured to move the two jaws from the clamping position to the free position.

6. The tool-holder according to claim 1, wherein the first fixing system or the second fixing system includes a plurality of orifices and a threaded rod the axes of which are parallel to the direction of the rail and wherein the first complementary fixing system, respectively the second complementary fixing system, includes:

for each orifice, a protuberance adapted to be inserted in the orifice, and a threaded hole adapted to receive the threaded rod.

7. The tool-holder according to claim 6, wherein the plurality of orifices and the threaded rod are disposed on a plate that is mounted on the slide and mobile in translation in a direction perpendicular to the longitudinal direction of the rail and parallel to the plane of the rail.

8. The tool-holder according to claim 1, wherein the carriage includes a base fixed to the movement system, a mobile support mounted on the base to rotate about a tool axis parallel to the longitudinal direction of the assembly bar, stop means for stopping the rotation of the mobile support, and the first assembly system arranged on the mobile support.

9. The tool-holder according to claim 8, wherein the support module includes a base carrying the second assembly system, a drawer mounted on the base to move in translation in a direction perpendicular to the plane of the rails, actuating means for moving the drawer on the base, and wherein the second fixing elements are disposed on the drawer.

10. The tool-holder according to claim 9, wherein the support module includes two pressure sensors aligned with each other in the longitudinal direction of the rails, wherein the pressure sensors are mounted on a spring-mounted slide mobile in translation on the drawer in a direction perpendicular to the plane of the rails, and wherein the tool-holder includes a control unit that controls the driving system and the actuating means and that receives information from the two pressure sensors.

* * * * *